US006785442B2

(12) United States Patent
Nicolas

(10) Patent No.: US 6,785,442 B2
(45) Date of Patent: Aug. 31, 2004

(54) MULTI-ORDER OPTICAL CROSS-CONNECT

(75) Inventor: Christophe Nicolas, Bicetre (FR)

(73) Assignee: Corning Incorporated, Corning, NY (US)

( * ) Notice: Subject to any disclaimer, the term of this patent is extended or adjusted under 35 U.S.C. 154(b) by 73 days.

(21) Appl. No.: 09/952,175

(22) Filed: Sep. 13, 2001

(65) Prior Publication Data

US 2002/0089721 A1 Jul. 11, 2002

(30) Foreign Application Priority Data

Sep. 13, 2000 (EP) .............................................. 00402532

(51) Int. Cl.[7] ................................................ G02B 6/34
(52) U.S. Cl. ......................................................... 385/37
(58) Field of Search ....................... 385/24, 37; 398/82, 398/83, 84, 43

(56) References Cited

U.S. PATENT DOCUMENTS 5,960,133 A   9/1999  Tomlinson ................... 385/18

FOREIGN PATENT DOCUMENTS

EP          0853440         7/1998

OTHER PUBLICATIONS

"Multichannel Frequency–Selective Switch Employing an Arrayed–Waveguide Grating Multiplexer with Fold–Back Optical Paths", Osamu Ishida et al., IEEE Photonics Technology Letters 6(1994) Oct., No. 10, pps. 1219–1221.
"Arrayed–waveguide grating add–drop multiplexer with loop–back optical paths", by Tachikawa et al., Electronics Letters, Nov. 25th 1993, vol. 29, No.24, pp. 2133–2134.
"First InP–based reconfigurable integrated add–drop multiplexer" by Vreeburg et al., IEEE Potonics Technology Letters, vol. 9, No. 2, Feb. 1997, pp. 188–190.

"New Focusing and Dispersive Planar Component Based on an Optical Phased Array" by M.K. Smit, 1998, Electronics Letters, vol. 24, No. 7, p. 385.

*Primary Examiner*—Javaid H. Nasri
(74) *Attorney, Agent, or Firm*—Gregory V. Bean; Mary Y. Redman

(57) ABSTRACT

A selective routing cross-connect device comprises a switch array, together with a phasar. The phasar comprises an array of channel waveguides, and first and second slab waveguides. A main input feeds a wavelength division multiplexed (WDM) signal into the first slab waveguide so that demultiplexed outputs corresponding to an $m^{th}$ diffraction order exit the second slab waveguide. First and second further waveguides feed respective sets of demultiplexed signals back into the second slab waveguide at positions offset from said $m^{th}$ diffraction order (preferably at locations slightly offset from the adjacent diffraction orders). The first further waveguide supplies those demultiplexed signals which are to remain in the main channel, together with any added signals, whereas the third waveguide supplies those demultiplexed signals which are to be dropped. Selection of component signals for maintenance, adding or dropping is performed by control of the switch array. The added demultiplexed signals can be generated by inputting a WDM add channel to the second slab waveguide at a free location (preferably offset from the $m^{th}$ diffraction order by two times the adjacent channel spacing), and looping back to the switch array the resultant demultiplexed outputs which exit the first slab waveguide.

16 Claims, 10 Drawing Sheets demultiplexing phasar multiplexing phasar

MULTI-ORDER OPTICAL CROSS-CONNECT

BACKGROUND OF THE INVENTION

1. Field of the Invention

The present invention relates to the field of optical communications and, more particularly, the invention relates to devices for selective routing of components of wavelength division multiplexed (WDM) optical signals. Specifically, the invention concerns devices adapted selectively to route components of WDM optical signals.

2. Technical Background

Wavelength division multiplexing (WDM) is increasingly being used in optical communications networks and the like in order to multiply the number of channels that can be transported along the optical fiber or waveguide. Recent demands for even greater multiplication of channels have led to the development of so-called "dense" WDM systems (DWDM). In such WDM and DWDM systems, it is necessary to be able selectively to withdraw from, or inject into, the main fiber or waveguide signals at particular wavelengths; this is generally referred to as the "ADD/DROP" function. In general, it is desired to ADD or DROP at one time a set of signals are respective different wavelengths and it is, thus, convenient if the signals to be added, and signals which have been dropped, can be handled in multiplexed form.

In the following references will be made only to WDM and WDM systems. However, unless the context demands otherwise, it is to be understood that these references cover DWDM and DWDM systems.

Implementation of the drop function involves the demultiplexing of the WDM optical signal propagating on the main fiber or waveguide, so as to separate out the components at different respective wavelengths. One or more particular wavelengths which are to be extracted ("dropped") are selected and routed to a special output channel (the drop channel) different from the main output. The other wavelengths are multiplexed back together and routed to the main output so as to continue propagating along the main fiber or waveguide. It should be recalled that the "dropped" signal is not simply extinguished: it is separated from the other signals so as to follow a different route.

In a similar way, implementation of the add function generally involves the demultiplexing of the WDM signal propagating on the main fiber or waveguide and the addition, to the separated components at different respective wavelengths, of one or more further signals (the "added" signals) at respective individual wavelengths. The original components are then multiplexed back together, along with the added components.

The add/drop functions are generally implemented together in a common device, generally referred to as an "add/drop multiplexer". Often, a first signal $S_{11}$ at a wavelength $\lambda_i$ is dropped and, in the same device, a second signal $S_{12}$ at this same frequency $\lambda_i$ is added: such devices are often referred to as "cross-connects". In the following, the expression "cross-connect" will be used to designate devices which implement add/drop functions regardless of the particular wavelengths being dropped and/or added and irrespective of whether both or only one of the functions of adding and dropping is implemented.

One example 10 of a cross-connect is shown schematically in FIG. 1. The cross-connect 10 of FIG. 1 is connected to four optical channels (labeled "Input", "Add", "Output" and "Drop" in FIG. 1), which are all here assumed to carry WDM signals comprising a plurality (in this simplified example, two) of components at respective different wavelengths. The device 10 comprises two demultiplexers, DEMUX1 and DEMUX2, two multiplexers, MUX1 and MUX2, and an array of optical switches each having first and second input terminals and first and second output terminals (in the simplified example discussed here, the array includes only two switches SW1 and SW2).

In the example illustrated in FIG. 1, the signal propagating in the Input channel is a WDM signal containing component signals at respective wavelengths $\lambda_1$ and $\mu_2$. This signal is applied to the demultiplexer DEMUX1, which separates out the component signals at the different wavelengths and feeds them to first input terminals of respective optical switches SW1 and SW2 of the switch array. The signal propagating in the Add channel is a WDM signal which may contain component signals at any or all of the wavelengths handled by the device (here $\lambda_1$ and $\lambda_2$). The Add channel signal is applied to demultiplexer, DEMUX2, which separates out the component signals at the different wavelengths and feeds them to respective second input terminals of the optical switches SW1 and SW2.

The first output terminal of each switch in the switch array is connected to a respective input terminal of the multiplexer MUX1, whereas the second output terminal of each switch in the switch array is connected to a respective input terminal of the multiplexer MUX2. The multiplexer MUX1 performs wavelength division multiplexing of the signals applied to its input terminals and outputs the resultant WDM signal to the Output channel. The multiplexer MUX2 performs wavelengths division multiplexing of the signals applied to its input terminals and outputs the resultant WDM signal to the Drop channel.

In the cross-connect 10 of FIG. 1, the optical switches SW1 and SW2 are controlled so as to pass to the multiplexer MUX2 those components of the original input signals which are to be "dropped", the remainder are passed to the multiplexer MUX1. Similarly, the optical switches SW1 and SW2 are controlled so as to pass to the multiplexer MUX1 all of the components of the Add signals. Thus, by suitably controlling the switches of the switch array it is possible selectively to route individual component signals at different wavelengths present in the WDM signal of the Input channel, and to add new signals at selected wavelengths provided via the Add channel.

The cross-connect 10 of FIG. 1 presents a number of disadvantages. In particular, the design involves use of a relatively large number of components, and the multiplexers and demultiplexers need to be very accurately tuned to the same set of wavelengths.

Alternative prior art cross-connects have been proposed in order to overcome the above-mentioned disadvantages. Specifically, devices have been proposed employing a loop-back configuration so as to enable a single component (a planar optical phased array or "phasar", also known as an arrayed-waveguide grating (AWG)) to perform all of the required multiplexing and demultiplexing.

The arrayed-waveguide grating or phasar was first proposed by M. K. Smit in 1988 in the paper "New focusing and dispersive planar component based on an optical phased array" in Electronics Letters, 24, 385. The structure and function of an arrayed-waveguide grating (AWG) multiplexer/demultiplexer will now be briefly summarized with reference to FIGS. 2a and 2b, which illustrate demultiplexer and multiplexer configurations, respectively.

As shown in FIGS. 2a and 2b, the AWG multiplexer/demultiplexer is made up of a phased array of waveguides 1 which are formed in a transparent medium, such as silica, which has been deposited on a substrate (not shown—typically made of silica or silicon) so that there is a constant increment δ1 in path length from the first waveguide in the array to the second, and so on, through to the last waveguide in the array. The input ends of the waveguides 1 lie along a curve $L_1$, and the output ends of the waveguides 1 lie along a curve $L_2$. Slab waveguides 2a and 2b are formed at respective ends of the array of channel waveguides 1, along the curves $L_1$ and $L_2$. Input and output waveguides 3a, 3b are formed so as to feed signals into and receive signals from the ends of the slab waveguides 2a, 2b remote from the phased array. In general, the phased array of waveguides 1, slab waveguides 2a, 2b, and input and output waveguides 3a, 3b are formed integrally by common deposition and etching processes.

When the arrayed waveguide grating device is used in demultiplexer configuration (FIG. 2a), WDM optical signals are input to a single input waveguide 3a and spread out within the slab waveguide 2a so as to enter each of the waveguides of the array 1. Because the arrayed waveguides 1 have different path lengths, a phase difference is created between the signals reaching the ends of the waveguides 1. (This is comparable to the case where optical signals are incident on a diffraction grating at an oblique angle, θ). When these signals exit from the arrayed channel waveguides, they interfere with one another as they propagate within the output slab waveguide 2b.

For a given order of diffraction, m, the component signals at respective different wavelengths present within the original WDM signal will be spatially spread out into a spectrum. These components signals are, thus, demultiplexed and they exit from the slab waveguide 2b at slightly differing spatial positions. These component signals are extracted from the slab waveguide 2b by a plurality of respective output waveguides 3b. It can be considered that the slab waveguide 2b has the effect of focusing component signals at respective wavelengths onto the different respective output waveguides 3b.

The precise spatial location at which a demultiplexed component signal at a given wavelength $λ_1$ will exit from the slab wavelength 2b, depends upon the length of the slab waveguide 2b and the increment δ1 in path length between the channel waveguides making up the phased array 1. However, each arrayed waveguide grating is designed to handle a specific set of wavelengths. Thus, the output waveguides 3b are positioned at the spatial locations where it is known (from calculation and design) that the signals at each respective wavelength will exit from the slab waveguide 2b.

When the arrayed waveguide grating is used in multiplexer configuration (FIG. 2b), the operation is a mirror image of the demultiplexer operation. A plurality of signals at respective different wavelengths is input to slab waveguide 2a via a plurality of input waveguides 3a. These optical signals spread out within slab waveguide 2a and are incident on the input ends of the channel waveguides of the phased array 1. An optical path difference (and corresponding phase difference) builds up between the signals propagating in the different channel waveguides of the phased array 1. When these signals pass into the output slab waveguide 2b and propagate therein, they recombine to form a single, WDM signal. This multiplexed signal is extracted by the single output waveguide 3b.

Arrayed waveguide gratings may advantageously be used for multiplexing and demultiplexing signals having a very small difference in wavelength. Thus, they are particularly well suited to DWDM applications. The demultiplexer design will, thus, focus on achieving a good spatial separation between the component signals at different but closely-spaced wavelengths which are present in a spectrum at a single order of diffraction, m.

Cross-connects have been proposed making use of AWGs (or "phasars") and embodying a loop-back configuration have been described in the papers "Arrayed-waveguide grating add-drop multiplexer with loop-back optical paths" by Tachikawa et al., Electronics Letters, 25$^{th}$ November 1993, Vol.29, No.24, pp. 2133–2134, and "First InP-based reconfigurable integrated add-drop multiplexer" by Vreeburg et al., IEEE Photonics Technology Letters. Vol.9, No.2, February 1997, pp.188–190. FIG. 3 is a simplified diagram illustrating the principle involved in such devices.

The cross-connect device 20 of FIG. 3 comprises a phasar 21, advantageously implemented as a planar device using integrated optics technology, and an array of optical switches each having first and second input terminals and first and second output terminals (in the simplified example discussed here, the array includes only two switches SW1 and SW2).

The cross-connect device 20 of FIG. 3 is connected to a Main Input channel and a Main Output channel, both of which carry WDM optical signals. The device 20 is also connected to a plurality of Add signal lines and Drop signal lines each of which can carry a signal at a respective individual wavelength.

More particularly, the waveguide 3a constituting the Main Input channel serves as a first input terminal of the phasar (which can be designated a demultiplexing input terminal) and the waveguide constituting the Main Output channel serves as a first output terminal of the phasar (which can be designated a multiplexing output terminal). There is a set of second output terminals 3b of the phasar 21 (which can be designated demultiplexing output terminals) each of which is connected to a first input terminal of a respective switch in the switch array. There is a set of second input terminals 3a' (which can be designated multiplexing input terminals) of the phasar 21 each of which is connected to a first output terminal of a respective switch in the switch array.

In the example illustrated in FIG. 3, the signal propagating in the Main Input channel is a WDM signal containing component signals at respective wavelengths $λ_1$ and $λ_2$. This signal is applied to the demultiplexing input terminal of the phasar 21 and propagates in the input slab waveguide (not shown) so as to enter and propagate in the waveguides of the phased array (also not shown). The component signals at different wavelengths are, in effect, diffracted in the phasar 21 and output at respective ones of the demultiplexing output terminals 3b' thereof. The separated component signals are then applied to first input terminals of the respective optical switches SW1 and SW2 of the switch array.

Each optical switch may receive at the second input terminal thereof an Add signal at a respective individual wavelength. The first output terminal of each switch in the switch array is connected to a respective one of the multiplexing input terminals 3a' of the phasar 21, whereas the second output terminal of each switch in the switch array is connected to a Drop signal line. The phasar 21 performs wavelength division multiplexing of the signals applied to the multiplexing input terminals thereof and outputs the resultant WDM signal at its multiplexing output terminal 3b. This WDM signal then propagates in the Main Output channel waveguide serving as the phasar multiplexing output terminal 3b.

In the device 20 of FIG. 3, the optical switches SW1 and SW2 are controlled so as to pass to the respective Drop signal lines those components of the original input signal which are to be "dropped", the remainder are passed back to the phasar 21. Similarly, the optical switches SW1 and SW2 are controlled so as to pass to the phased array 21 all of the signals on the Add signal lines. Thus, by suitably controlling the switches of the switch array it is possible selectively to route individual component signals at different wavelengths present in the WDM signal of the Main Input channel, and to add new signals at selected wavelengths provided via the Add signal lines.

The cross-connect device 20 of FIG. 3 presents a number of disadvantages. In particular, the added signals and dropped signals are handled individually, at the corresponding switch, rather than in multiplexed form. Moreover, there can be cross-talk between the signals present at the demultiplexer outputs 3b' of the phased array 21 and the multiplexer output 3b thereof (which serves as the Main Output channel). It has been realized that this cross talk arises because the same order of diffraction is used both by the demultiplexer outputs and the multiplexer output of the phasar 21.

SUMMARY OF THE INVENTION

The present invention seeks to overcome the above-mentioned disadvantages of prior art techniques for selective routing of components of a WDM signal. More particularly, the preferred embodiments of the present invention provide devices for selective routing of components signals of WDM optical signals, at respective different wavelengths, using a common element for performing multiplexing and demultiplexing, achieving low crosstalk and accommodating multiplexed add and drop channels.

In various embodiments of selective routing device according to the invention, a common elements is used, in a loop-back configuration, to perform multiplexing and demultiplexing of components of a WDM optical signal having respective different wavelengths, and the multiplexing and demultiplexing functions do not make use of the same order to diffraction.

More particularly, the present invention provides a selective routing device adapted to operate on a wavelength division multiplexed (WDM) optical signal, said WDM optical signal comprising a plurality of component signals at respective different wavelengths, the selective routing device being adapted to route said component signals selectively and comprising: diffraction means adapted to receive optical signals and produce therefrom diffracted optical signals corresponding to a plurality of orders of diffraction including an $m^{th}$ order of diffraction, diffracted optical signals of consecutive orders of diffraction being spaced apart from each other by a known spacing (D); first input means for making said WDM optical signal incident on said diffraction means whereby to cause production of a first diffracted optical signal, corresponding to an $m^{th}$ order of diffraction, said first diffraction optical signal comprising a plurality of first component signals at respective different wavelengths and at respective first locations, adjacent first locations being spatially separated from one another by a known separation (a); selection means for selecting, from among said plurality of first component signals, one or more second component signals at respective different wavelengths, the remaining first component signal(s) constituting third component signal(s); second input means for making said one or more second component signals incident on said diffraction means, said second input means being adapted to present said one or more second component signals to said diffraction means at respective second locations, said second locations being spatially separated from one another and offset from said first locations, said second locations being selected to cause production of a second diffracted optical signal comprising said one or more second component signals wavelength division multiplexed together; and a main output for outputting said second diffracted optical signal; wherein said second diffracted optical signal does not correspond to the $m^{th}$ order of diffraction.

It is possible to implement the invention using a diffraction grating, such as, for example, a ruled bulk diffraction grating), and associated lenses, as the diffraction means and employing first and second input means which are adapted to direct the WDM optical signal and the second component signals, respectively, towards the diffraction grating in directions which are at selected different angles and such that the first and second component signals propagate in opposite senses.

In one embodiment of the invention, the selective routing device comprises a phasar constituted by a phased array of waveguides, a first slab waveguide positioned at one end of the phased array and a second slab waveguide positioned at the other end of the phased array. In this case, the first input means includes a main waveguide arranged to feed signals to the first slab waveguide: the diffraction means is constituted by the phasar: and each of the input means other than the first input means comprises one or more waveguides positioned adjacent the second slab waveguide means. It will be appreciated that the phasar is operated in a bidirectional manner.

The WDM optical signal is applied at the main input of the phasar (via a first one of the slab waveguides) and demultiplexed components thereof are collected (via the second slab waveguide) at first locations corresponding to an mth order of diffraction. Those of the demultiplexed component signals which are to be maintained in the main signal are selected as second component signals and routed back to the phasar at second locations (on the second slab waveguide) so as to be multiplexed together for output (via the first slab waveguide). Those of the demultiplexed component signals which are to be routed in a different manner from the main signal (dropped) are designated third components signals and are not routed back to the second locations.

In one embodiment of the invention, those demultiplexed (second) component signals which are selected to be maintained in the main signal are fed back to the phasar at second locations which correspond to an order of diffraction (m+1 or m−1) adjacent to that used for the initial demultiplexing outputs. However, a small degree of crosstalk will arise at these locations due to energy, from the initial WDM optical signal, which is diffracted into the m+1 and m−1 orders of diffraction.

Thus, in the preferred embodiments of the invention the second component signals are fed back to the phasar at second locations which are offset both from the mth order of diffraction and the m+1th and the m−−1th orders of diffraction. It has been found to be particularly advantageous to use second locations which are offset from the first locations (mth order of diffraction) by a distance substantially equal to the sum of the free spectral range (that is the spacing (D) between consecutive orders of diffraction) and the adjacent channel spacing (that is, the separation (a) between adjacent ones of the first locations).

The third component signals (that is, those of the demultiplexed (first) component signals which are to be routed differently from the main signal) can be directed to a second output channel (Drop channel) on an individual basis by means of separate signal lines together constituting a second output channel.

However, it may be preferable to output the third component signals in multiplexed form. This can be done by making use of third input means for making said third component signal(s) incident on said diffraction means, said third input means being adapted to present said third component signal(s) to said diffraction means at respective third locations, said third locations being spatially separated from one another and offset from said first and second locations, said third locations being selected to cause production of a third diffracted optical signal comprising said third component signal(s) wavelength division multiplexed together; and outputting the third diffracted optical signal to the second output channel.

In preferred embodiments of the invention, the third input means is a further waveguide arranged to feed signals to the phasar slab waveguide that outputs the first diffracted optical signal. Thus, a single phasar performs all of the demultiplexing and multiplexing required for selective routing of components of the input WDM optical signal and output of the dropped components in a multiplexed form.

The third locations can be positioned corresponding to an order of diffraction adjacent the mth order of diffraction. For example, if the first locations corresponds to the mth order of diffraction and the second locations correspond to the m+1th order of diffraction, the third locations can correspond to the m−1th order of diffraction. However, once again, there would be a small degree of crosstalk due to energy originating from the initial WDM optical signal.

Thus, it is preferred that said third locations should be offset from positions corresponding to the mth order of diffraction and adjacent orders of diffraction. It has been found to be convenient to employ third locations offset from the mth order of diffraction by a distance substantially equal to the sum of the free spectral range (D) and the adjacent channel spacing (a), and offset from the second locations by a distance (2D+2a) substantially equal to twice said sum.

In certain embodiments of the invention, components at particular wavelengths can be added to the main signal and/or both added to and dropped therefrom. Each such (fourth) component signal to be added can conveniently be included among the second component signals output from the selection means to the second input means. The fourth component signals can be added on an individual basis by means of separate signals lines together constituting a second input channel. However, it is preferable if the added signals are handled in multiplexed form.

Thus, in the preferred embodiments of the invention providing the added function, there is a second input (Add) channel adapted to receive a further wavelength division multiplexed (WDM) optical signal, the further WDM optical signal comprising a plurality of fourth component signals at respective different wavelengths; fourth input means for making said further WDM optical signal incident on said diffraction means at a fourth location, said fourth location being offset from the first locations, whereby to cause production of a fourth diffracted optical signal, said fourth diffracted optical signal comprising said fourth component signal(s) at respective fifth locations, said fifth locations being spatially separated from one another; transfer means for routing said fourth component signal(s) from said fifth locations to said selection means; wherein the selection means is adapted to include said fourth component signals among said one or more second component signals output to said second input means.

In such preferred embodiments of the invention, a single phasar provides all of the demultiplexing and multiplexing required for selective routing of the original components of the WDM optical signal and for adding (and, if desired, dropping) component signals in multiplexed form.

In the selective routing devices according to the invention, the selection means is advantageously implemented as an array of optical switches. These may be optical 2×2 switches.

Preferably, the principal elements of the devices according to the preferred embodiments of the invention are fabricated as planar lightwave devices. Thus, for example, at least the phasar and, optionally, the combination of the phasar and the switch array, will be fabricated by conventional planar lightwave circuit techniques.

It will be seen that certain embodiments of the present invention constitute add/drop multiplexers. These devices have the advantage that they employ a single element for all the required demultiplexing and multiplexing—thus avoiding the need for careful wavelength tuning of different circuit elements. Moreover, by using multiplexing inputs which correspond to an order of diffraction different from that used by the demultiplexing inputs (or which correspond to locations offset from such orders of diffraction), crosstalk in the preferred embodiments is low. Further, multiplexed Add and Drop channels may be accommodated.

BRIEF DESCRIPTION OF THE DRAWINGS

Further features and advantages of the present invention will become clear from the following description of preferred embodiments thereof, given by way of example and not to be taken as limititative of the present invention, and illustrated by the accompanying drawings, in which:

FIG. 2 is a schematic representation of an arrayed-waveguide grating device (or "phasar"), in which:

FIG. 4 is a schematic representation of a phasar used in preferred embodiments of the present invention, in which:

FIG. 5 is a first diagram illustrating the spatial locations of inputs and outputs of the demultiplexing phasar of FIG. 4a;

FIGS. 13a and 13b are a schematic representation of a planar optical device corresponding to preferred embodiments of a device according to the present invention, providing the Add and Drop functions, in which:

FIG. 13a represents the whole device, and

FIG. 13b represents an enlargement of a switch portion of the device;

DETAILED DESCRIPTION OF THE PREFERRED EMBODIMENTS

The selective routing devices according to the preferred embodiments of the present invention make use of a single phasar, in a new configuration, to perform all the demultiplexing and multiplexing required when selectively routing components of a WDM optical signal. The principle behind this new phasar configuration will be described with reference to FIGS. 4 to 6 which, to aid understanding, treat the case where only two wavelengths, $\lambda_1$ and $\lambda_2$, are involved. It will be understood that the invention can be applied to a much larger number of wavelengths.

Figure 2A:
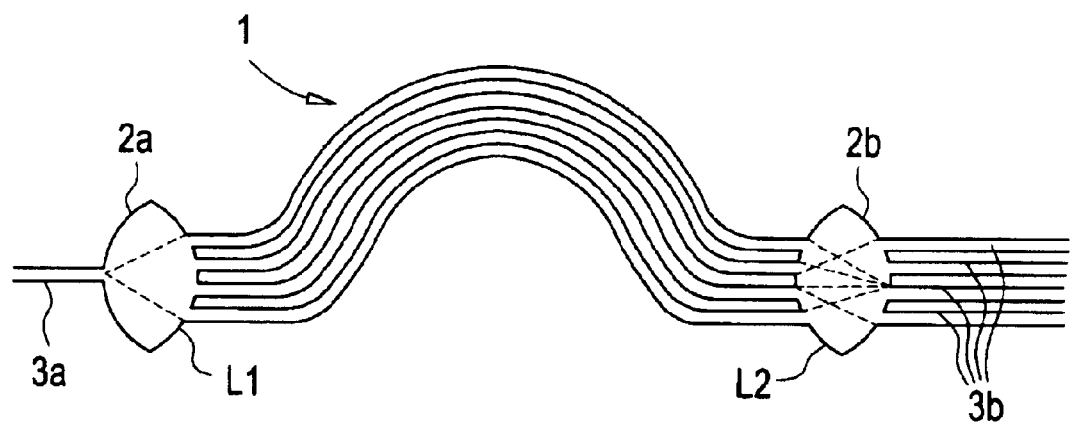
FIG. 2a represents the device in demultiplexer configuration.
Figure 2B:
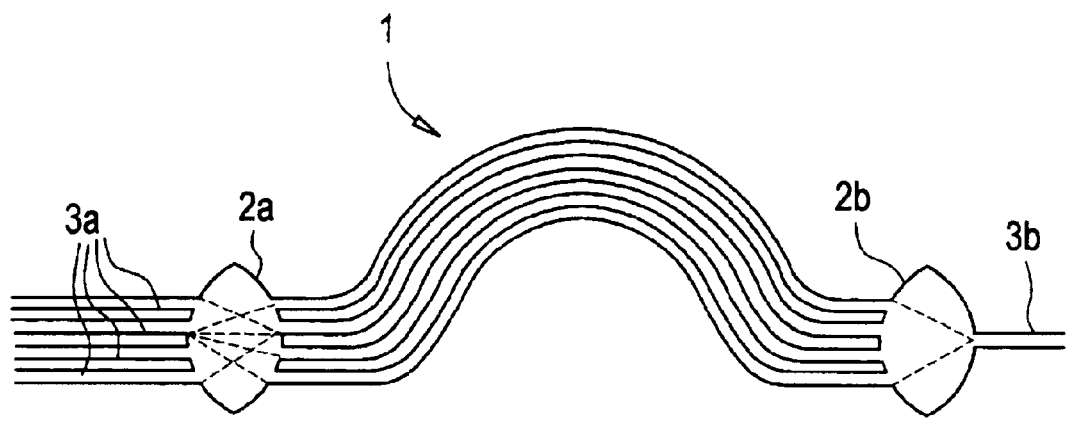
FIG. 2b represents the device in multiplexer configuration.

In the devices according to preferred embodiments of the invention, the phasar acts to demultiplex components, at respective wavelengths $\lambda_1$ and $\lambda_2$, of a WDM signal that is input to the input slab waveguide 2a of the phasar via a main input waveguide 3a. As explained above (with reference to FIG. 2a), the phased array 1 of waveguides in the phasar and output slab waveguide 2b cause diffracted optical signals to be produced at the exit end of the output slab 2b. For a given order of diffraction, m, there will be separate diffracted signals at each of the wavelengths making up the initial WDM signal, and these separate diffracted signals will be spaced apart by a distance, a, called the adjacent channel spacing. Moreover, diffracted signals will be produced at several orders of diffraction notably m+1th and m−1th orders of diffraction, as well as the mth, but with a much weaker efficiency.

Figure 4A:
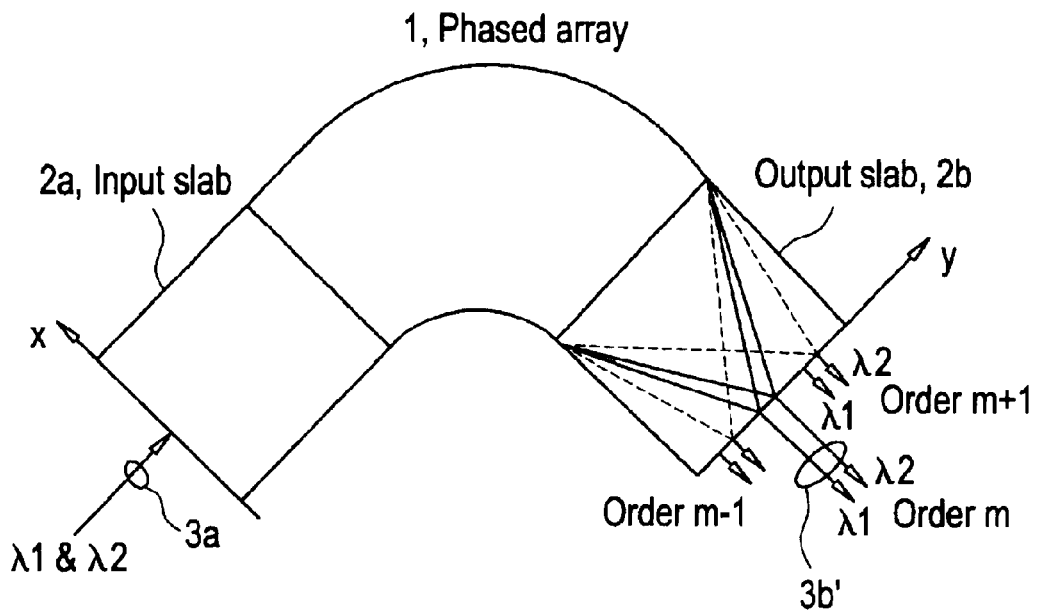
FIG. 4a represents the device in demultiplexer configuration.
Figure 4B:
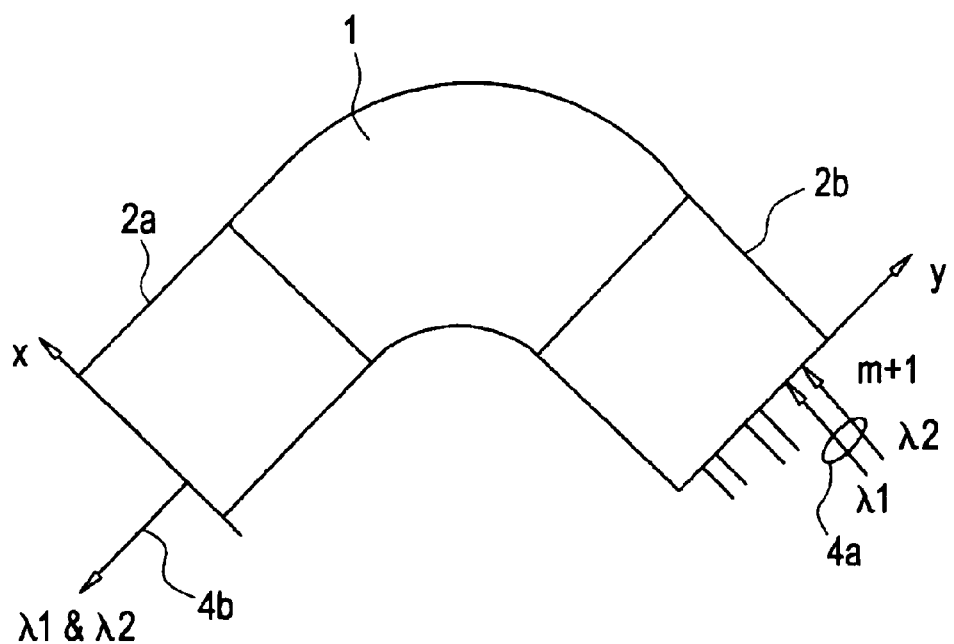
FIG. 4b represents the device in multiplexer configuration.
Figure 5:
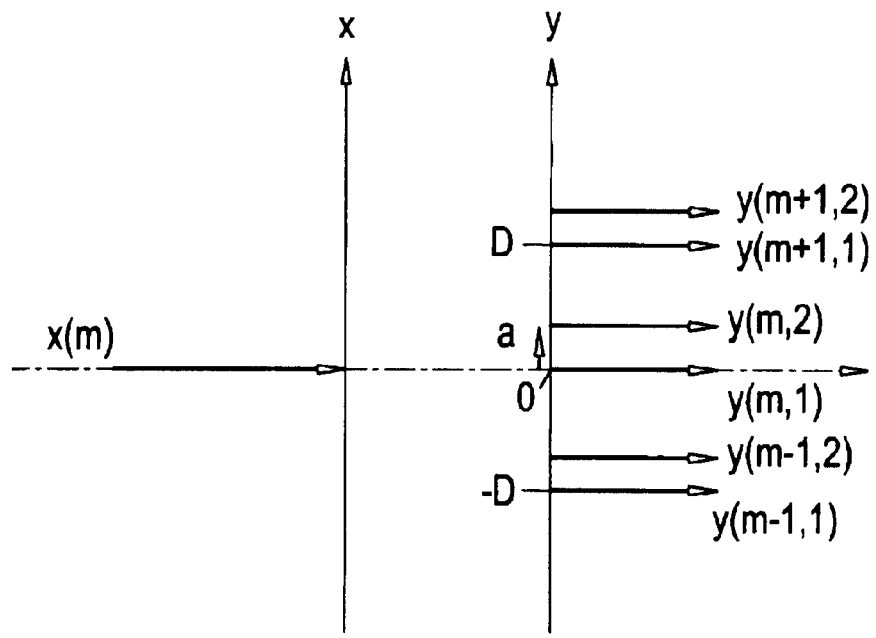

FIG. 5 illustrates the signals input and output to the phasar in the demultiplexing configuration of FIG. 4a. In FIG. 5, the line x represents the input circular arc of the slab waveguide 2a, whereas the line y represents the output circular arc of the slab waveguide 2b (corresponding representations are used in FIGS. 4, 6–9 and 11–14). As here illustrated, the input WDM signal, x(m), gives rise to a first diffracted optical signal corresponding to the mth order of diffraction and having components y(m,1) and y(m,2) at respective wavelengths $\lambda_1$ and $\lambda_2$ and spaced apart from one another by the adjacent channel spacing, a. In FIG. 5, the location at which the component y(m,1) exits the slab waveguide y is designated at the origin, 0. The component signal y(m,2), thus occurs at y=a.

The input signal x(m) also gives rise to a diffracted signal corresponding to the m+1th order of diffraction and having components y(m+1,1) and y(m+1,2) at respective wavelengths $\lambda_1$ and $\lambda_2$ and spaced apart from one another by the adjacent channel spacing, a. Input signal x(m) also gives rise to a diffracted signal corresponding to the m−1th order of diffraction and having components y(m−1,1) and y(m−1,2) at respective wavelengths $\lambda_1$ and $\lambda_2$ and spaced apart from one another by the adjacent channel spacing, a. For each wavelength $\lambda_1$, the diffracted signals corresponding to consecutive orders of diffraction are spaced apart from each other by a distance (free spectral range) D. In other words, the diffracted component signal y(m+1,1) exists slab waveguide 2b at y=+D, whereas component y(m+1,1) exits slab waveguide 2b at y=−D. Similarly, the diffracted component signal y(m+1,2) exits slab waveguide 2b at y=+D+a, whereas component y(m−1,2) exits slab waveguide 2b at y=−D+a.

Figure 1:
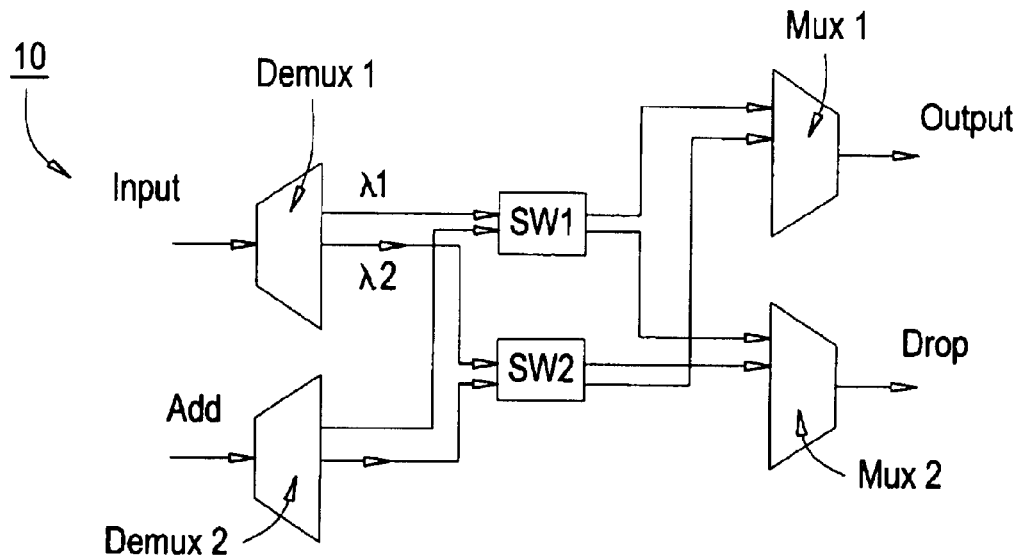
FIG. 1 shows a first prior art device providing the ADD/DROP function.
Figure 3:
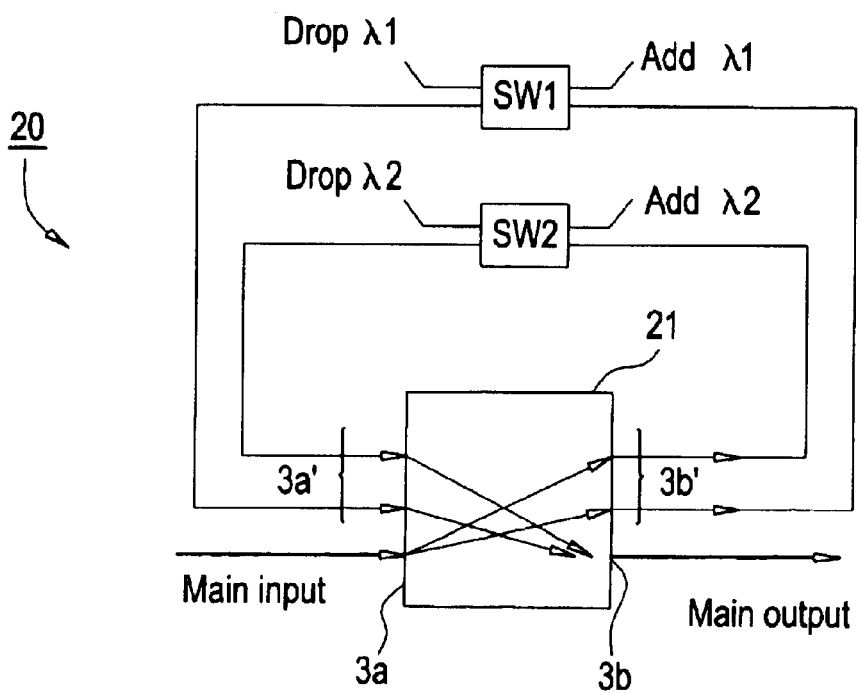
FIG. 3 shows a second prior art device providing the ADD/DROP function.

In conventional phasar applications, only one order of diffraction is used for demultiplexing. These demultiplexing outputs either are used as the main output (3b) from the device or, in the loop-back configuration illustrated in FIG. 3, are used as an intermediate output (3b') which undergoes further processing before output from the device. The diffraction efficiency is high for the mth order of diffraction whereas it is relatively low for the m+1th orders of diffraction. Demultiplexed channel waveguides are placed only at positions corresponding to the mth order of diffraction.

However, as illustrated in FIG. 4b, waveguides 4a can be formed adjacent the slab waveguide 2b, at locations (y=D and y=D+a) corresponding to demultiplexed outputs of the m+1th order of diffraction (and/or the m−1th order of diffraction, not illustrated in FIG. 4b). If component signals at the respective different wavelengths $\lambda_1$ and $\lambda_2$ are input to the phasar via these waveguides 4a, so as to propagate through the phasar in the opposite sense to the original WDM signal, then these component signals will be multiplexed together. The resultant WDM signal will exit the slab waveguide 2a (at x=±D, depending upon whether the m−1th or m+1th multiplexing input position was used) and can be collected by an output waveguide 4b formed adjacent the slab waveguide 2a.

Figure 6:
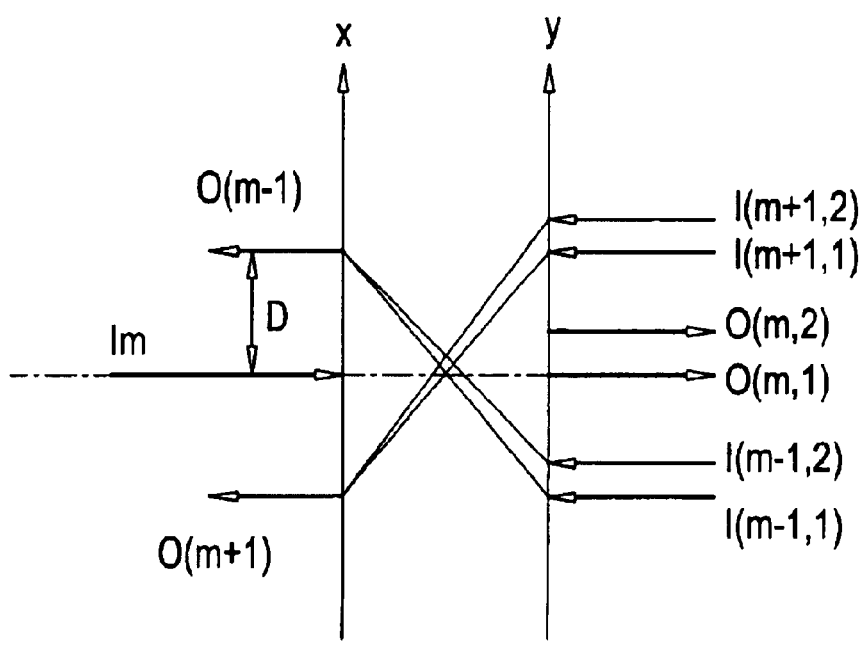
FIG. 6 is a diagram illustrating the spatial locations of inputs and outputs of a phasar performing multiplexing and demultiplexing, used in preferred embodiments of the invention.

It has been realized that the above-described demultiplexing and multiplexing functions can be integrated so as to operator the phasar as a bi-directional device, having relatively low crosstalk. More particularly, as illustrated in FIG. 6, a first WDM optical signal 1 m can be fed to the slab waveguide 2a via a main input waveguide 3a and will cause the slab waveguide 2b to output demultiplexed first component signals O(m,1) and O(m,2) at respective wavelengths $\lambda_1$ and $\lambda_2$, corresponding to the mth order of diffraction. Other component signals 1(m+1,1) and 1(m+1,2) at respective different wavelengths can be input to the slab waveguide 2b at locations which are offset relative to said mth order of diffraction (for example at locations corresponding to the m+1th order of diffraction) and will cause the slab waveguide 2a to output a resultant WDM signal O(m+1) at an output location offset from the main input waveguide. Alternatively or additionally, other component signals 1(m−1,1) and 1(m−1,2) at respective different wavelengths can be input to the slab waveguide 2b at locations offset compared with the mth order of diffraction (for example, corresponding to the m−1th order of diffraction) and will cause the slab waveguide 2a to output a resultant WDM signal O(m−1) at an output location offset both from the main input waveguide and from the output location of resultant signal O(m+1).

When a phasar is operated in a bi-directional manner as described above, there is relatively low crosstalk between the signals undergoing demultiplexing and multiplexing, because the multiplexing function does not make use of the other of diffraction used by the demultiplexing function.

Figure 7:
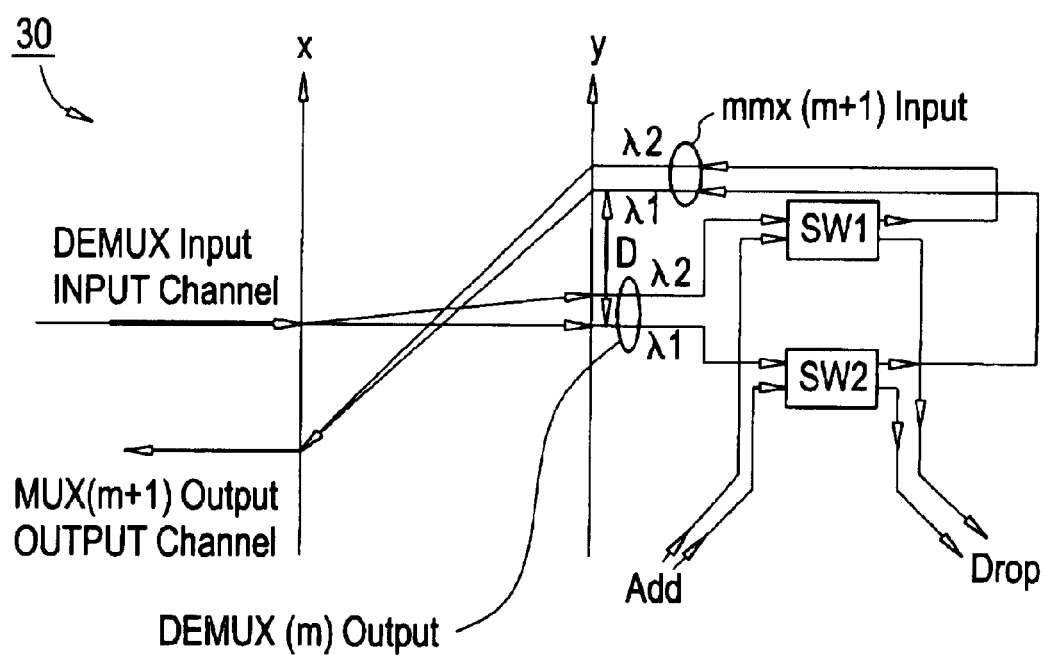
FIG. 7 is a diagram schematically representing the configuration of a phasar and switch array according to one embodiment of the invention, providing the Add and Drop functions.

The application of the above-described principle in a simple cross-connect 30 according to one embodiment of the present invention is illustrated schematically in FIG. 7.

In the cross-connect 30 of FIG. 7, a main WDM optical signal is fed into slab waveguide 2a of a phasar via an INPUT channel constituted by a main waveguide 3a formed adjacent the slab waveguide 2a. This INPUT channel constitutes a demultiplexing input to the phasar. The components of the main WDM optical signal are demultiplexed by the phasar and exit slab waveguide 2b at locations corresponding to the mth order of diffraction. Each of these demultiplexed component signals is routed to an input terminal of a respective optical 2×2 switch, here SW1 and SW2. (The function of optical 2×2 switches will be explained in greater detail below, with reference to FIG. 10).

If it is desired to maintain a component signal at a given wavelength from the main WDM signal, then the switches are controlled to pass said component signal to a respective waveguide formed adjacent the slab waveguide 2b at a location corresponding to the m+1th order of diffraction. The set of these waveguides constitutes a multiplexing input to the phasar. These maintained component signals propagate through the phasar in the opposite sense to the initial main WDM signal and give rise to a resultant WDM signal exiting from slab waveguide 2a a location offset from the main input waveguide. A main output waveguide is located adjacent the slab waveguide 2a so as to collect the resultant WDM signal.

If it is desired to drop a component signal at a given wavelength from the main WDM signal, then the switches SW1 and SW2, which have second output terminals connected to drop signal lines, can be controlled to feed these component signals to the respective drop signal line (the set of drop signal lines constitutes a Drop channel).

Moreover, the switches SW1 and SW2 have second input terminals which may receive, from respective Add signal lines, additional component signals at respective wavelengths that are to be added to the main WDM signal. The switches SW1 and SW2 can be controlled to feed each such additional component signal to a respective one of the multiplexing input waveguides formed adjacent the slab waveguide 2b at a location corresponding to the m+1th order of diffraction.

It is to be understood that various changes may be made in the cross-connect of FIG. 7. Most notably, the multiplexing input waveguides can be located at positions corresponding to orders of diffraction different from the m+1th (for example, the m−1th), or can be offset with respect to such orders of diffraction.

The simple cross-connect of FIG. 7 has the advantage that it uses a single phasar to accomplish all of the required demultiplexing and multiplexing, with relatively low crosstalk. However, the added and dropped component signals are handled on an individual basis. It is preferable to handle such signals in multiplexed form.

Figure 8:
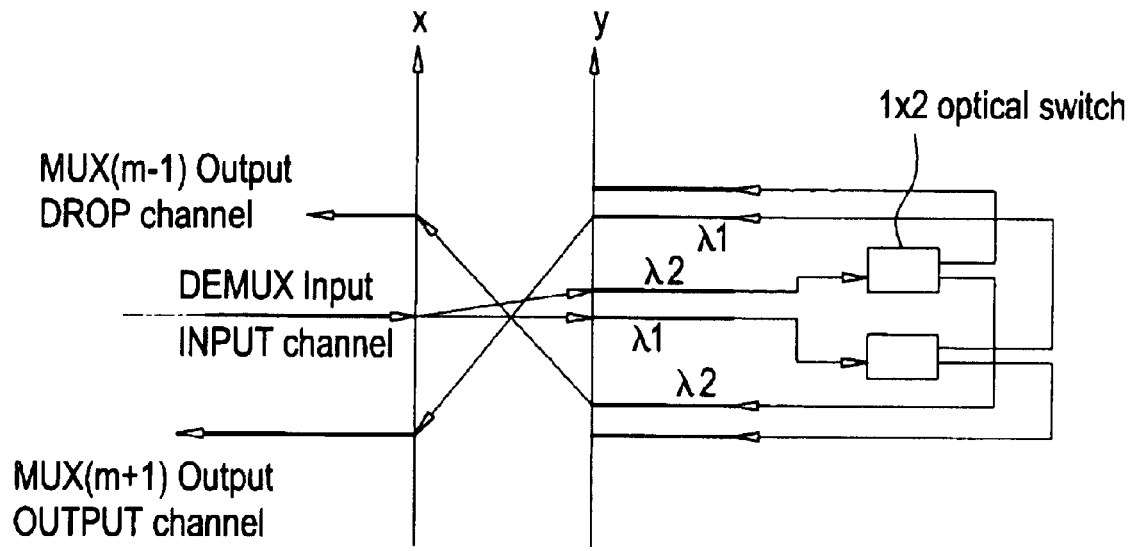
FIG. 8 is a diagram schematically representing the configuration of a phasar and switch array according to a first preferred embodiment of the invention, providing the Drop function.

FIG. 8 illustrates a selective routing device according to first preferred embodiment of the invention, providing a Drop function. Many of the components of the device of FIG. 8 resemble those of the cross-connect of FIG. 7, except that in the device of FIG. 8 the switches SW1 and SW2 are 1×2 switches lacking an Add input, and the second output of each switch is directed, not to an individual Drop signal line but to a respective waveguide formed adjacent the slab waveguide at locations corresponding to the m−1th order of diffraction. The component signals input to these multiplexing (m−1) input waveguides give rise to a further resultant WDM signal exiting the slab waveguide 2a at a location offset both from the Main input channel waveguide and the main output channel waveguide. This further resultant signal can be extracted using a drop channel waveguide formed adjacent the slab waveguide 2a.

In the selective routing device of FIG. 8, by suitable control of the switches SW1 and SW2, components of the initial WDM optical signal can be directed either to the multiplexing (m+1) Input waveguides, so as to participate in the resultant WDM signal output on the main output channel waveguide, or to the multiplexing (m−1) Input waveguides, so as to participate in the further resultant WDM signal output on the drop channel waveguide. In FIG. 8, the component signal at wavelength $\lambda_2$ is dropped whereas the compound signal at wavelength $\lambda_1$ is maintained in the main WDM signal output on the main output channel waveguide.

In the devices illustrated in FIGS. 7 and 8, the output and drop channels corresponds to two diffraction orders of the phasar, in the multiplexing direction, that are separated by 2 units (orders of diffraction). The diffraction efficiency of the phasar with respect to the signal input at the multiplexing (m+1) waveguide is high at the location (in the plane x of the slab waveguide 2a) that corresponds to the main output channel. It is weak at the location corresponding to the position of the main input channel waveguide and still weaker at the location corresponding to the position of the drop channel waveguide. However, this can still generate some degree of crosstalk between the output channel and the drop channel.

Figure 9:
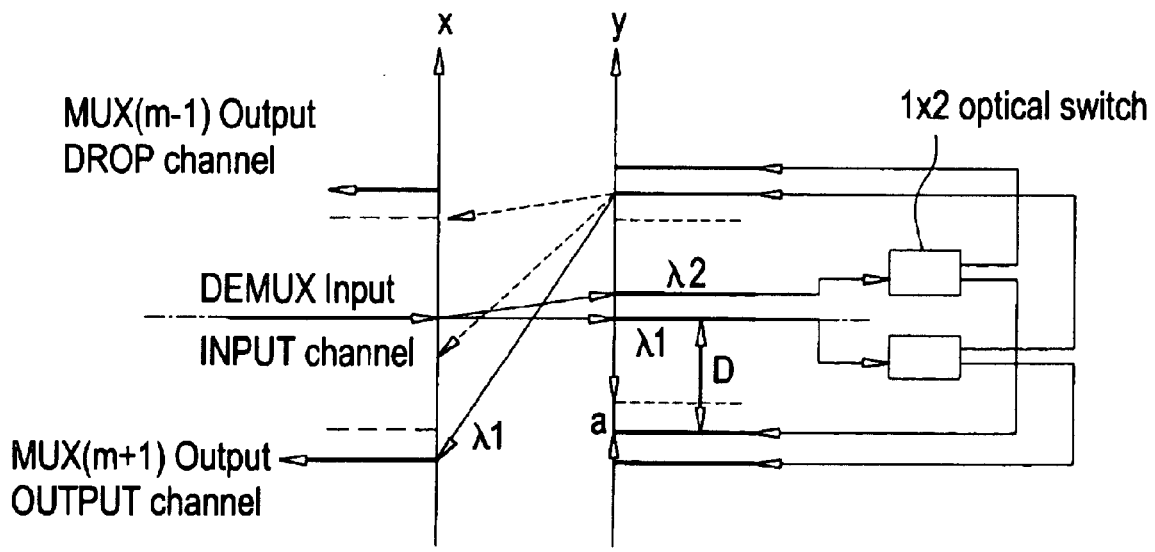
FIG. 9 is a diagram schematically representing the configuration of a phasar and switch array according to a second preferred embodiment of the invention, providing the Drop function.

FIG. 9 illustrates a selective routing device, providing the Drop function, according to a second preferred embodiment of the invention, in which crosstalk can be considerably reduced.

In the device of FIG. 9, the multiplexing (m+1) and (m−1) inputs are offset from the positions corresponding to the m+1 and m−1 orders of diffraction. It has been found to be advantageous for this offset to be substantially equal to the adjacent channel spacing a. In other words, the respective multiplexing inputs are offset, as follows:

1(m+1,1) is offset from y=+D to y=+(D+a)

1(m+1,2) is offset from y=+(D+a) to y=+(D+2a)

1(m−1,1) is offset from y=−D to y=−(D+a)

1(m−1,2) is offset from y=−(D−a) to y=−D

This offset causes the main output WDM signal to exit from the slab waveguide 2a at position x=−(D+a) and the drop channel WDM signal to exit from the slab waveguide 2a at x=D+a. The main output channel waveguide and drop channel waveguide are repositioned accordingly.

Because of this offset, the diffraction efficiency of the phasar with respect to the to the signals input at the multiplexing (m+1) waveguides is high at the location (in the plane x of the slab waveguide 2a) that corresponds to the main output channel and the parasitic diffraction peaks at orders m and m−1 are directed toward locations where there is no output waveguide. This reduces substantially the crosstalk due to energy from the component signals that could otherwise have been coupled into the drop channel.

Figure 10:
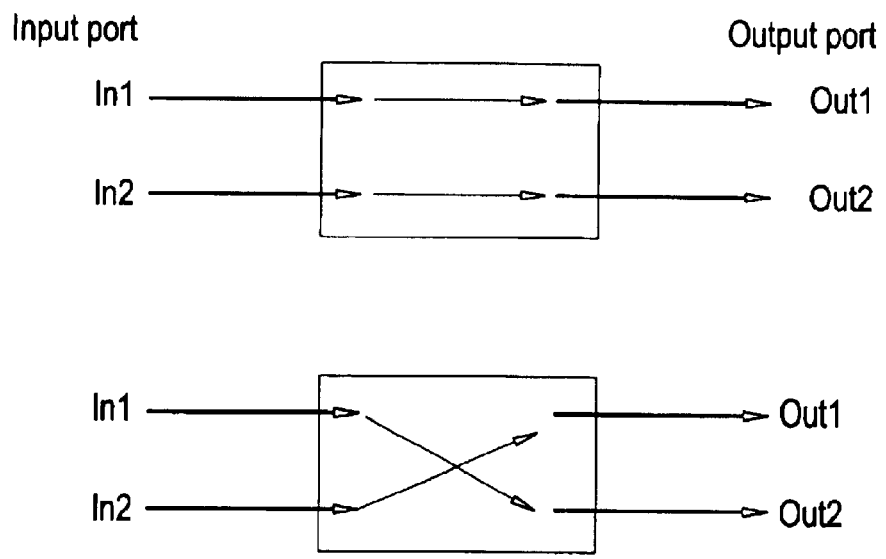
FIG. 10 is a diagram illustrating the function of a two-way optical switch.

FIG. 10 illustrates the function of an optical 2×2 switch which is used in certain embodiments of the invention. As shown in FIG. 10, such switches have two input ports and two output ports. Such a switch can be set in one of two states: the "BAR" state, and the "CROSS" state. When the switch is in the "BAR" state, the signals input at first and second input ports are routed to the first and second output ports of the switch, respectively. When the switch is in the "CROSS" state, the signals input at first and second input ports are routed to the second and first output ports of the switch, respectively.

Figure 11:
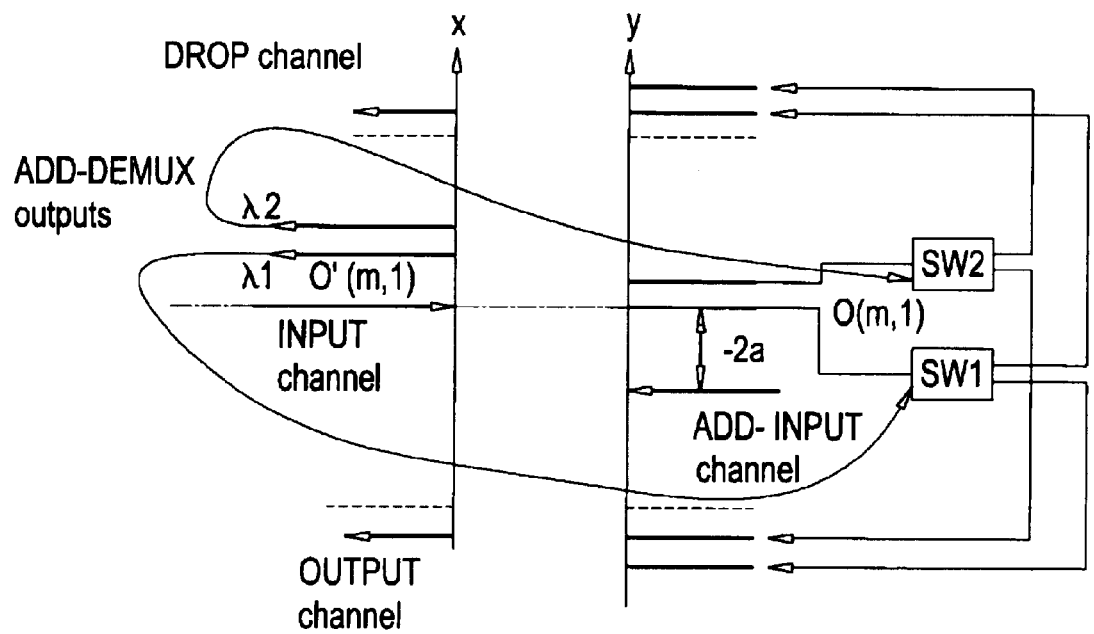
FIG. 11 is a diagram schematically representing the configuration of a phasar and switch array according to a modified version of the second preferred embodiment of the invention, providing the Add and Drop functions.

FIG. 11 represents a modified version of the device of FIG. 9, which has been altered so as to provide the add function as well as the drop function, and to handle a multiplexed add channel. It is to be understood that this modification of FIG. 9 could equally well be applied to the devices shown in FIGS. 7 and 8.

In the device of FIG. 11, the switches SW1 and SW2 are optical 2×2 switches of the type illustrated in FIG. 10. The two outputs of the switches SW1 and SW2 correspond to the outputs of the switches in the FIG. 9 device. However, each switch has an additional input terminal for receiving an additional component signal at a respective wavelength, coming from an add channel.

Moreover, in the device of FIG. 11, and add input channel waveguide is formed adjacent the slab waveguide 2b, at a location which is free from other waveguides, so as to feed a further WDM signal into that slab waveguide 2a. It has been found advantageous to position this add channel input waveguide at y=−2a, where a=adjacent channel spacing. Other multiples of a may be used, but y=±a suffers from cross-talk problems. Further y=±(ka+ϵ), where k is an integer≠0 or 1, and ϵ is an offset, can be used. This further WDM signal propagates in the phasar and the components thereof are demultiplexed. The add channel demultiplexed component signals exit the slab waveguide 2a at respective locations and can be collected using waveguides located at positions offset from the other waveguides that are adjacent to the slab waveguide 2a. These collected components signals are then routed to the second input terminals of the switches SW1 and SW2.

In the device of FIG. 11, by suitable control of the switches SW1 and SW2, components of the initial WDM signal can either be maintained in the main channel, dropped and/or replaced by added component signals.

Figure 12:
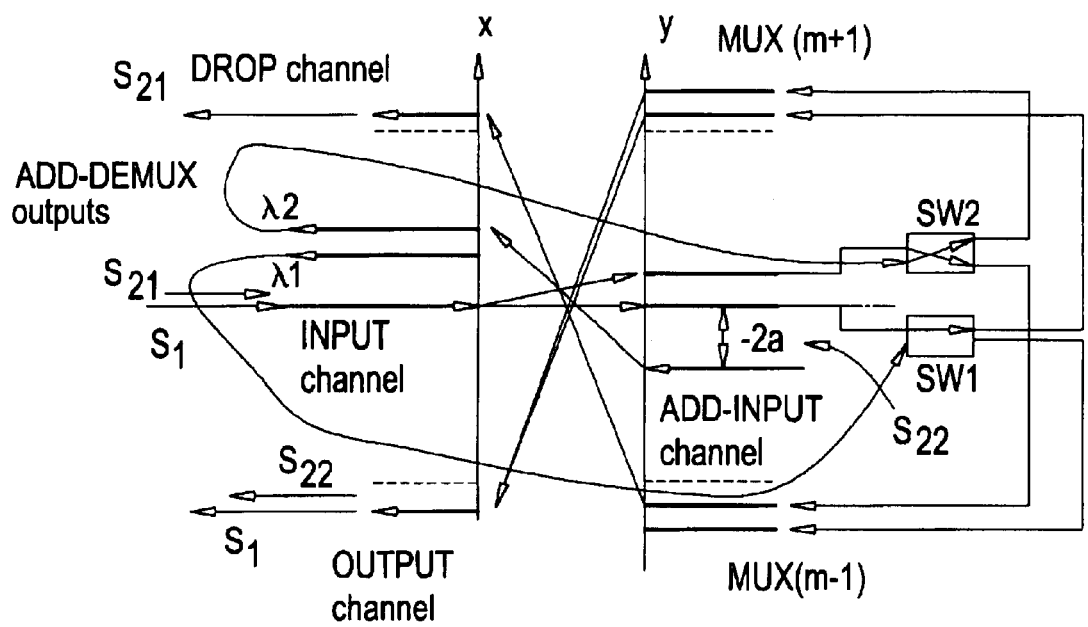
FIG. 12 is a diagram illustrating an example of application of the device of FIG. 11.

FIG. 12 illustrates one example of the application of the device of FIG. 11, in which two digital signals S1 and S21 carried at wavelengths 1 and 2 respectively, are fed into the main input channel. A digital signal S22 carried by wavelength 2 is fed to the add channel. The switch SW2 is set in the cross state, thus directing the demultiplexed signal S21 toward the multiplexing (m−1) input waveguide, and directing the demultiplexed signal S22 towards the multiplexing (m+1) waveguide. Switch SW1 is set in the bar state, thus directing the demultiplexed signal S1 toward the multiplexing (m+1) input waveguide. Consequently, S1 and S22 are multiplexed together into the main output channel and S21 is multiplexed alone into the drop channel.

This example shows how the wavelength 2 that was originally dedicated to the digital signal S21 later carries the digital signal S22, S22 has been "added" whereas S21, still carried at 2, has been "dropped".

The selective routing devices of the present invention can be fabricated in an integrated manner, using standard planar lightwave optical circuit technology. This gives rise to a compact planar component.

Figure 13A:
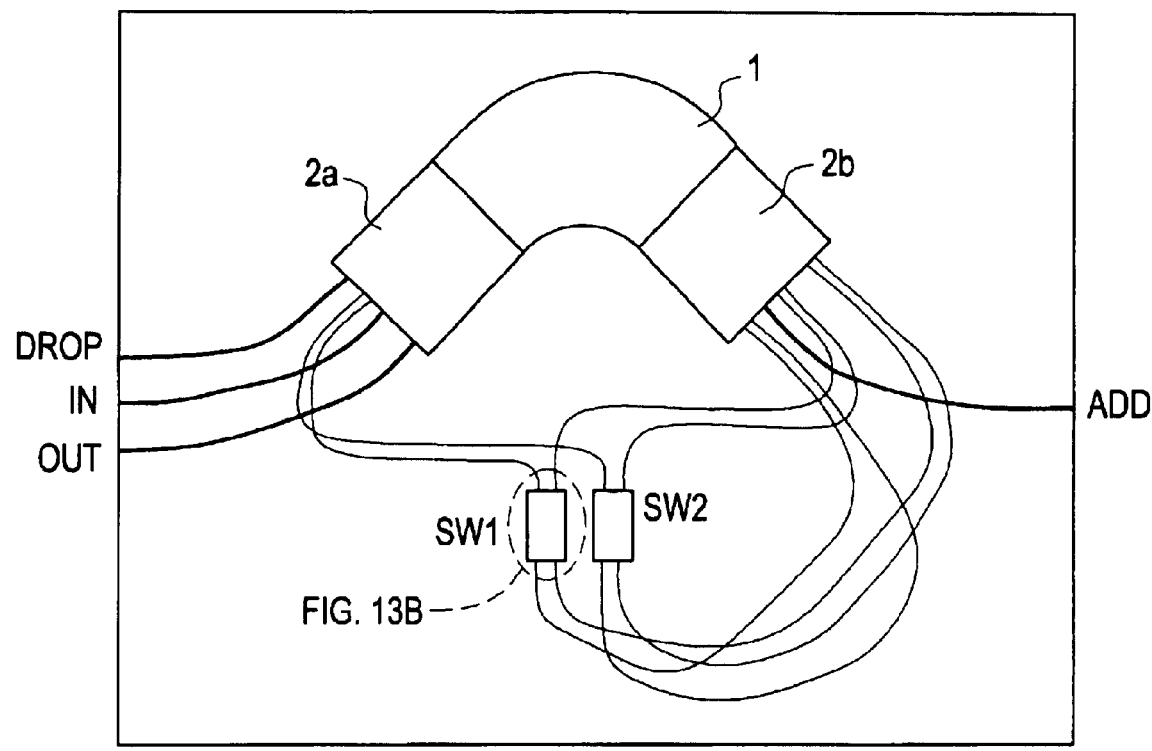
Figure 13B:
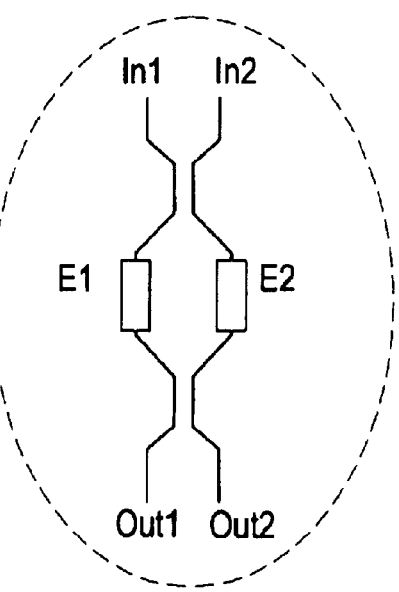

FIG. 13 illustrates the case where the device of FIG. 11 is implemented as a planar lightwave optical circuit fabricated by depositing silica on a silicon substrate by any convenient method, combined with silica lithography using standard techniques. In the example illustrated in FIG. 13, the phasar and switches are integrated together into a unique planar component.

In the example of FIG. 13, the switches are implemented as Mach-Zehnder interferometers combined with metal electrodes. This is shown in the enlarged section inset into FIG. 13.

Figure 14:
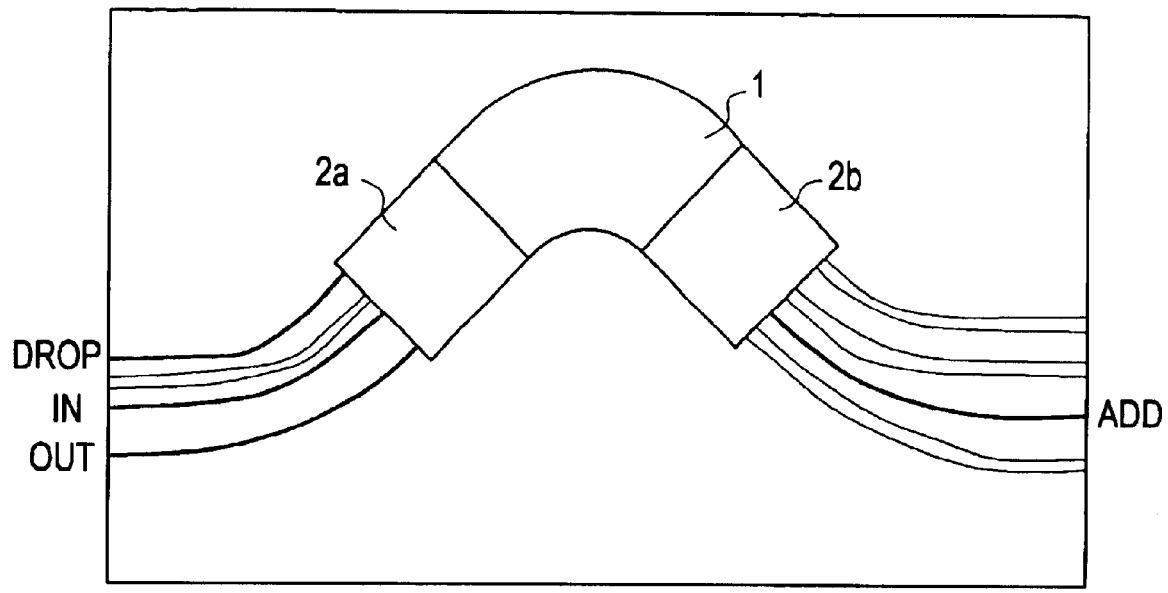
FIG. 14 is a schematic representation of a planar optical device corresponding to the phasar portion of preferred embodiments of device according to the present invention, providing the Add and Drop functions.

When fabricating the selective routing devices by planar lightwave optical circuit techniques, the preferred embodiments of the invention are not limited to the use of silica on silicon. Other materials can be used, such as InP, or silica deposited on a silica substrate. Furthermore, as illustrated in FIG. 14, the switch array can be made separately from those elements which are integrated into the planar lightwave device. In the example of FIG. 14, the integrated planar device comprises the phasar, with waveguides arriving at the edge of the planar substrate. Optical fibers will be connected to these waveguide terminations and either to optical network (for the Input, Output, Add and Drop channels), or to a port of the separate switch array.

Figure 15:
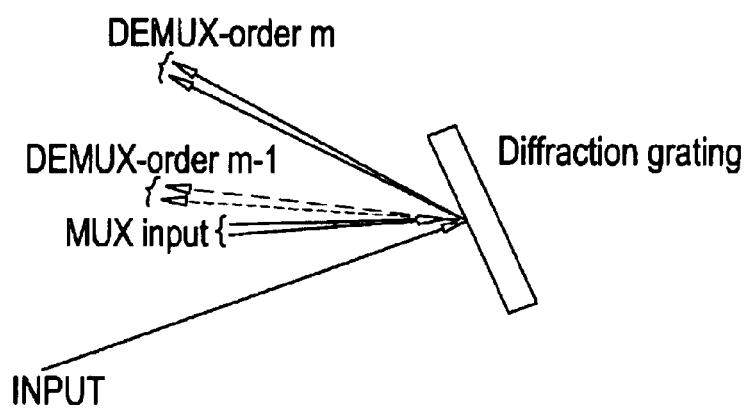
FIG. 15 illustrates a third preferred embodiment of the present invention, using a diffraction grating.

Although the preferred embodiments of wavelength-selective routing device according to the present invention use phasars as the single element performing all of the required demultiplexing and multiplexing, the invention could, as illustrated in FIG. 15, alternatively use a diffraction grating (notably a ruled bulk diffraction grating), and appropriate lenses (not shown).

As indicated in FIG. 15, this kind of diffraction grating is characterized by diffraction orders which are angularly separated in free space. A main WDM signal input to the diffraction grating via a main Input channel is demultiplexed into the set of its component signals. This set of component signals arise with greatest energy at an mth diffraction order, but the same set of component signals arises also, at reduced energy, at adjacent diffraction orders (only the m−1th order is illustrated in FIG. 15).

As in the above-described embodiments of the invention, the WDM main output signal from the diffraction grating is generated by using multiplexing inputs which do not correspond to the same order of diffraction as that used for demultiplexing the initial WDM signal. In the example of FIG. 15, the main output signal is generated by using multiplexing inputs directed towards the diffraction grating at an angle which is substantially equal to (or, as illustrated here, slightly offset from) the angle corresponding to the m−1th order of diffraction. A signal in a multiplexed drop channel (not shown) can be generated by using multiplexing inputs directed towards the diffraction grating at angles substantially equal to (or slightly offset from) the m+1th order of diffraction. A switch array is used, in the same manner as in the foregoing embodiments, to select wavelengths for maintenance in the main channel signal, or for dropping or adding. A free angular position can be used to demultiplex components of a multiplexed add channel, these demultiplexed component signals then being routed to the switch array.

It is to be understood that the present invention is not limited to the use of switch arrays consisting of only two switches. The number of switches in the switch array will depend upon the number of wavelengths accommodated by the device. As mentioned above, this number of wavelengths is not limited to two, and preferably is a large number so as to enable a large number of channels to be accommodated.

Further, although the specific embodiments discussed above use the mth order of diffraction for demultiplexing of the Main Input signal and the m+1th and m−1th orders of diffraction, respectively, for multiplexing of the Main Output signal and drop channel, the invention is not limited to this arrangement: other orders of diffraction may be used for the respective channels. For example, the m+1th order of diffraction could be used for the demultiplexing of the Main Input channel and the mth and m−1th orders of diffraction could be used, respectively, for multiplexing the Main Output channel and drop channel.

Moreover, although in the above-described specific embodiments, certain of the various waveguides are offset from one another by distances D (spacing between consecutive orders of diffraction) and/or a (adjacent channel spacing), it is to be understood that these distances can be varied by offset values $\epsilon$, $\epsilon'$, these offset values being relatively small. For example, the multiplexing inputs for the Main Output channel may be spaced by D+$\epsilon$ from the demultiplexed outputs of the Main Input channel.

While the invention has been particularly illustrated and described with reference to preferred embodiments thereof, it will be understood by those skilled in the art that the above and other alterations may be made without departing from the scope of the invention as defined in the accompanying claims.

What is claimed is:

1. A selective routing device adapted to operate on a wavelength division multiplexed (WDM) optical signal, said WDM optical signal comprising a plurality of component signals at respective different wavelengths, the selective routing device being adapted to route said component signals selectively and comprising:

diffraction means, said diffraction means being adapted to receive optical signals and produce therefrom diffracted optical signals corresponding to a plurality of orders of diffraction including an $m^{th}$ order of diffraction, diffracted optical signals of consecutive orders of diffraction being spaced apart from each other by a spacing (D);

first input means for making said WDM optical signal incident on said diffraction means whereby to cause a first diffracted optical signal, corresponding to an $m^{th}$ order of diffraction, to be produced by the diffraction means, said first diffracted optical signal comprising a plurality of first component signals at respective different wavelengths and at respective first locations, adjacent first locations being spatially separated from one another by a separation (a);

selection means for selecting, from among said plurality of first component signals, one or more second component signals at respective different wavelengths, the remaining first component signal(s) constituting third component signal(s);

second input means for making said one or more second component signals incident on said diffraction means, said second input means being adapted to present said one or more second component signals to said diffraction means at respective second locations, said second locations being spatially separated from one another and offset from said first locations, said second locations being selected to cause production of a second diffracted optical signal comprising said one or more second component signals wavelength division multiplexed together; and a main output for outputting said second diffracted optical signal;

wherein said second diffracted optical signal does not correspond to the $m^{th}$ order of diffraction.

2. A selective routing device according to claim 1, wherein said second locations are offset from said first locations by a distance substantially equal to said spacing (D) between consecutive orders of diffraction.

3. A selective routing device according to claim 1, wherein said second locations are offset from said first locations by a distance substantially equal to the sum of said spacing (D) between consecutive orders of diffraction and said separation (a) between said first locations.

4. A selective routing device according to claim 1, 2 or 3, and comprising a second output channel, wherein the selection means is adapted to direct said third component signal (s) to said second output channel.

5. A selective routing device according to claim 1, 2 or 3, and comprising:

a second output channel, and third input means for making said third component signal (s) incident on said diffraction means, said third input means being adapted to present said third component signal(s) to said diffraction means at respective third locations, said third locations being spatially separated from one another and offset from said first and second locations, said third locations being selected to cause production of a third diffracted optical signal comprising said third component signal(s) wavelength division multiplexed together;

wherein said second output channel is adapted to receive for output said third diffracted optical signal.

6. A selective routing device according to claim 5, wherein:

said third locations are offset from said first locations by a distance substantially equal to said spacing (D) between consecutive orders of diffraction, and offset from said second locations by a distance (2D) substantially equal to twice said spacing (D) between consecutive orders of diffraction.

7. A selective routing device according to claim 5, wherein:

said third locations are offset from said first locations by a distance substantially equal to the sum of said spacing (D) between consecutive orders of diffraction and said separation (a) between said first locations, and offset from said second locations by a distance (2D+2a) substantially equal to twice said sum.

8. A selective routing device according to claims 1 to 7, and comprising a second input channel adapted to receive one or more fourth component signals at respective different wavelengths; wherein the selection means is adapted to include said fourth component signal(s) among said one or more second component signals output to the second input means.

9. A selective routing device according to any one of claims 1 to 7, and comprising:

a second input channel adapted to receive a further wavelength division multiplexed (WDM) optical signal, said further WDM optical signal comprising one or more fourth component signals at respective different wavelengths;

fourth input means for making said further WDM optical signal incident on said diffraction means at a fourth location, said fourth location being offset from said first and second locations, whereby to cause production of a fourth diffracted optical signal, said fourth diffracted optical signal comprising said fourth component signal(s) at respective fifth locations, said fifth locations being spatially separated from one another;

transfer means for routing said fourth component signal(s) from said fifth locations to said selection means;

wherein the selection means is adapted to include said fourth component signals among said one or more second component signals output to said second input means.

10. A selective routing device according to claim 9, wherein:

said fourth location is offset from said first locations by a distance (2a) substantially equal to twice said separation (a) between said first locations.

11. A selective routing device according to any one of claims 1 to 10, wherein said diffraction means comprises a diffraction grating, and said spacing and separation are an angular spacing and an angular separation.

12. A selective routing device according to any one of claims 1 to 10 and comprising a phasar constituted by a phased array of waveguides having first and second ends, a first slab waveguide at the first end of the phased array and a second slab waveguide at the second end of the phased array;

wherein:

said first input means comprises a main waveguide located adjacent the first slab waveguide;

said diffraction means comprises said phasar;

each of the input means other than said first input means comprises one or more waveguides positioned adjacent said second slab waveguide means; and said spacing and separation are linear distances.

13. A selective routing device according to claim 12, wherein said first and second slab waveguides and phased array of waveguides are fabricated as an integrated planar lightwave device.

14. A selective routing device according to any previous claim wherein said selection means comprises a plurality of optical 2×2 switches.

15. A selective routing device according to claim 12, wherein said first and second slab waveguides, phased array of waveguides and plurality of optical 2×2 switches are fabricated as an integrated planar lightwave device.

16. A selective routing device according to any one of the previous claims, wherein the device is an add/drop multiplexer.

* * * * *